(12) United States Patent
Sun (10) Patent No.: US 6,593,703 B2
(45) Date of Patent: Jul. 15, 2003

(54) APPARATUS AND METHOD FOR DRIVING A HIGH INTENSITY DISCHARGE LAMP

(75) Inventor: Yiyoung Sun, Beverly, MA (US)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/880,822

(22) Filed: Jun. 15, 2001

(65) Prior Publication Data

US 2002/0190665 A1 Dec. 19, 2002

(51) Int. Cl.[7] .............................................. H05B 37/02
(52) U.S. Cl. ................................ 315/224; 315/209 CD; 315/243; 315/360
(58) Field of Search ............................. 315/224, 209 R, 315/225, 226, 209 CD, 291, 307, 360, 219, 241 R, 242, 243, 244

(56) References Cited

U.S. PATENT DOCUMENTS

| | | | |
|---|---|---|---|
| 4,734,624 A | * 3/1988 | Nagase et al. | 315/174 |
| 4,912,374 A | 3/1990 | Nagase et al. | 315/244 |
| 5,434,474 A | * 7/1995 | Ukita et al. | 315/127 |
| 5,742,132 A | * 4/1998 | Huber et al. | 315/209 R |
| 6,020,691 A | * 2/2000 | Sun et al. | 315/307 |
| 6,144,172 A | * 11/2000 | Sun | 315/291 |
| 6,426,597 B2 | * 7/2002 | Rast et al. | 315/219 |
| 6,448,720 B1 | * 9/2002 | Sun | 315/219 |

* cited by examiner

Primary Examiner—Don Wong
Assistant Examiner—Thuy Vinh Tran
(74) Attorney, Agent, or Firm—Greenblum & Bernstein, P.L.C.

(57) ABSTRACT

A circuit arrangement and control thereof for igniting a high intensity discharge lamp, for reducing current stresses imposed on semiconductor devices during a polarity transition of a lamp voltage or lamp current, and for maintaining a parasitic current within an envelope of a square wave lamp current. A high frequency ignition voltage is only applied to the lamp during a starting operation. After the lamp breaks down in the starting operation, an imbalanced high frequency current flows through the lamp to assist a glow-to-arc transition. The high discharge current of the buck filter capacitor that is generally applied to the semiconductor devices during the polarity transition of the lamp voltage or lamp current, due to lamp extinguishing, is reduced. The lamp current is maintained as a low frequency square wave. Any spikes that may occur at the polarity transition of the lamp voltage or lamp current are superimposed on the lamp current within the envelope of the low frequency square wave lamp current.

32 Claims, 10 Drawing Sheets

FIG. 13

APPARATUS AND METHOD FOR DRIVING A HIGH INTENSITY DISCHARGE LAMP

BACKGROUND OF THE INVENTION

1. Field of the Invention

The present invention relates to a circuit arrangement and controller that generates a high frequency resonant ignition voltage to ignite a high intensity discharge (HID) lamp, to maintain a low frequency square wave lamp current while spikes are superimposed on the low frequency square wave lamp current within an envelope of the low frequency square wave lamp current, to reduce stresses on switching devices during a polarity transition of the lamp voltage or lamp current when the HID is being extinguished, and to improve a lamp glow-to-arc transition by applying an imbalanced high frequency current after a lamp breakdown.

2. Discussion of Background and Relevant Information

Two distinctly different methods exist to ignite an electronic high intensity discharge (HID) lamp. In a first method, the lamp is ignited using a pulsed method. In a second method, the lamp is ignited using a resonant method. Because of safety concerns associated with a peak magnitude of an ignition voltage, the resonant method, which requires a voltage having a smaller peak magnitude (in comparison with the pulsed method), remains the preferred technique for use in electronic high intensity discharge (HID) lamp ballasts.

Two distinctively different methods of operating the lamp after ignition are employed with electronic high intensity discharge lamp ballasts. In a first method, the lamp is operated at a high frequency range of, for example, several tens of kilohertz. In a second method, the lamp is operated at a low frequency range of, for example, several hundreds of hertz. Because of acoustic resonance problems associated with operating the lamp in the high frequency range, it is preferable to operate the lamp at the low frequency range.

Figure 8:
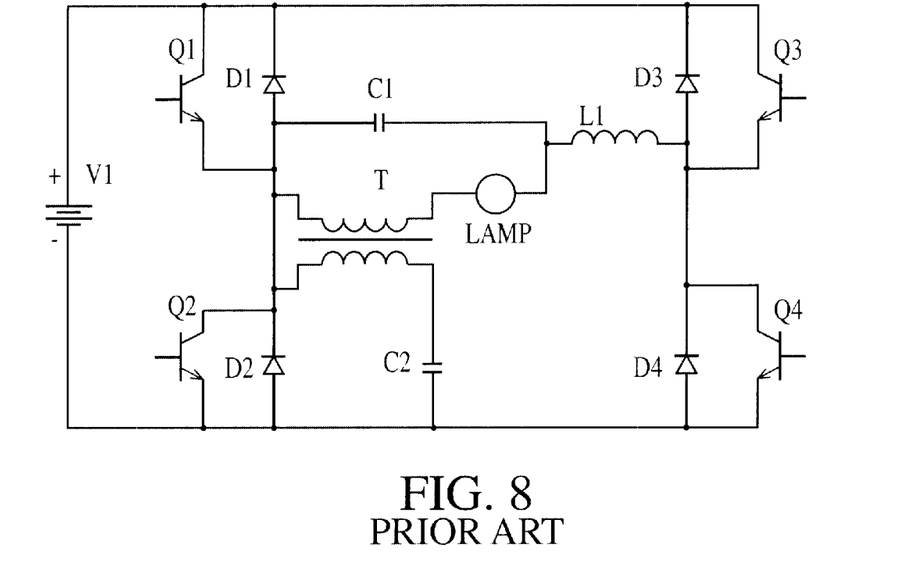
FIG. 8 illustrates a prior art electronic high intensity discharge lamp control circuit.
Figure 9:
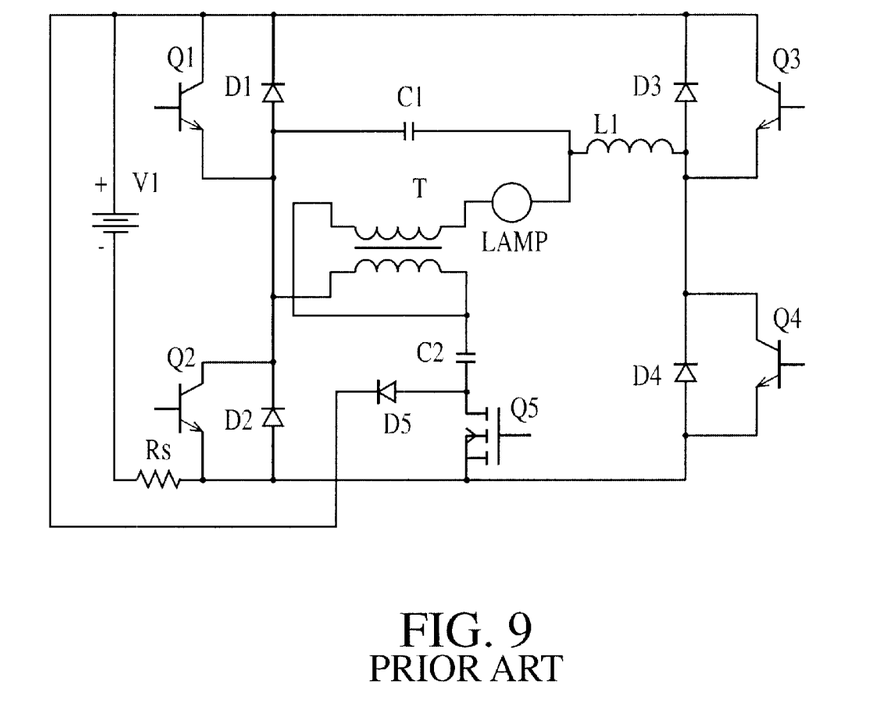
FIG. 9 illustrates a modification of the control circuit of FIG. 8.

FIGS. 8 and 9 illustrate two approaches for generating a high frequency voltage with sufficient energy to ignite the lamp and to run a lamp in a low frequency operation. In FIG. 8, a discharge lamp driving circuit includes a combined chopper and high frequency inverter. Depending upon the control scheme implemented with switches Q1 to Q4, this configuration can serve many design purposes.

U.S. Pat. No. 4,912,374 describes one such implementation. It is well known that HID lamps may exhibit an acoustic resonance when it is operated at a high frequency. U.S. Pat. No. 4,912,374 discloses a method that reduces the acoustic resonance problem by interrupting the high frequency current with a smoothed DC current. Buck inductor L1 and buck filter capacitor C1 form a buck resonant network. Transformer T and ignition capacitor C2 form an inverting resonant network. If semiconductor switches, such as, for example, transistor switching pair Q1 and Q4 and transistor switching pair Q2 and Q3 are complementarily switched at a high frequency rate, two high frequency AC currents will flow through the lamp. A first high frequency AC current will flow through the capacitor C1 and the inductor L1. A second high frequency AC current will flow through the ignition capacitor C2 and the transformer T.

As a result, a loop current is formed between the buck filter capacitor C1, the transformer T, and the lamp. In a chopper (or buck) configuration, switch Q1 is ON and switches Q2 and Q3 are completely OFF while switch Q4 is switched at a high frequency rate. As a result, a DC current flows through the lamp from left to right (of the circuit) during this period. When switches Q1 and Q2 change state (e.g., the operation state of switch Q1 changes from ON to OFF and the operation state of switch Q2 changes from OFF to ON), the voltage at the junction of switches Q1 and Q2 changes from HIGH to LOW within a very brief period of time, such as, for example, a couple of hundred nanoseconds. This rapid (sudden) voltage change causes a spike current to flow out of the ignition capacitor C2 and the lamp, from the left to the right, and for current to flow out of the buck filter capacitor from right to left, back to the junction of switches Q1 and Q2.

Note that the direction of the spike current is the same as the direction of a DC lamp current. When switch Q3 is switched at a high frequency rate, switch Q2 is ON and switches Q1 and Q4 are completely OFF. Thus, a DC current flows from right to left through the lamp during this period. When switch Q2 changes from an ON state to an OFF state and switch Q1 changes from an OFF state to an ON state, the voltage at the junction of switches Q1 and Q2 changes from LOW to HIGH within a couple of hundred nanoseconds. This rapid (sudden) change on voltage causes a spike current to flow into the ignition capacitor C2 and the lamp from right to left, and for current to flow in the buck filter capacitor C1, from left to right. The spike current has the same direction as the DC lamp current. Unfortunately, in both cases, the spike current re-enforces the DC lamp current, causing the instantaneous lamp current at the spike to be higher than the average DC current. In the case where only a DC current (e.g., low frequency square wave current) is applied to the lamp during a normal operation, the spike current is higher than an envelope of the low frequency square wave current. This is not desirable.

Figure 10:
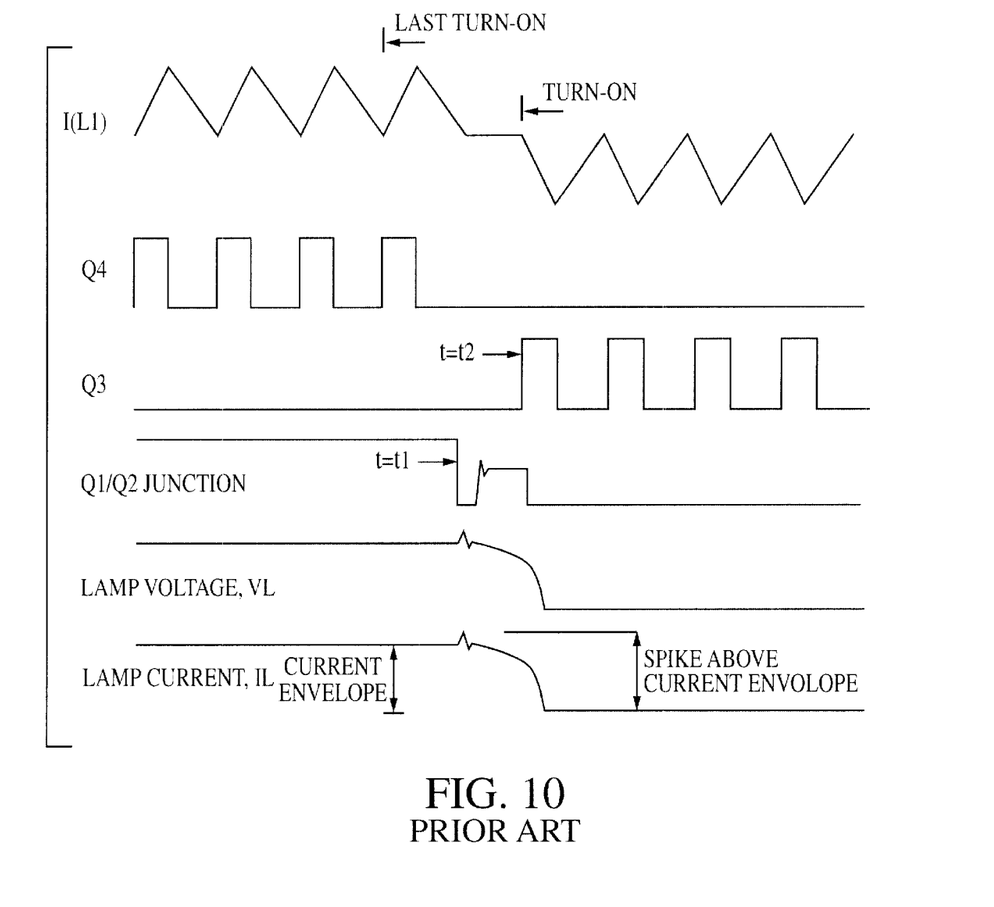
FIG. 10 illustrate sample waveforms produced by a prior art full wave control circuit.

A more detailed explanation on how the circuit behaves during the polarity transition of the lamp voltage or lamp current will now be provided. Generally, during the transition, the four switches Q1 to Q4 operate as shown in FIG. 10. During a first half cycle, switch pair Q1 and Q4 is active. At the end of the first half cycle, all switches are turned OFF at time t equals t1 to avoid cross conduction. Then, a so-called "dead time" begins, during which time there is no electrical conduction. After the dead time (e.g., when time t equal t2), switching pair Q2 and Q3 become active. The load current reverses its polarity and flows in the opposite direction, as compared with the active half cycle of switch pair Q1 and Q4. Because of the switching at time t equals t1, the voltage at the junction of switching pair Q1 and Q2 suddenly goes from being substantially equal to bus voltage V(1), to either float or become substantially equal to a negative rail voltage, to continue "free-wheeling". Unfortunately, this instantaneous change in voltage causes a spike current to flow through the ignition capacitor C2 and the lamp in the same direction as the low frequency square wave current.

FIG. 9 illustrates a modification of U.S. Pat. No. 4,912,374. According to this circuit, switch Q5 and diode D5 are added, so that the lamp current exhibits a clean square wave. Switch (e.g., MOSFET) Q5 is turned (switched) OFF after the lamp is ignited, or whenever the high frequency current is not needed for the operation of the lamp. When switch Q5 is switched OFF, the ignition capacitor C2, is electrically disconnected from the circuit. Thus, no current flows through the ignition capacitor C2 and the lamp, due to the switching of switch pair Q1 and Q2. Diode D5 functions to prevent any voltage overshoot during the switching of switch (MOSFET) Q5.

Unfortunately, modifying the circuit of U.S. Pat. No. 4,912,374 to include the high voltage MOSFET Q5, the high voltage diode D5, and a driving circuitry required to drive switch Q5 increases the complexity of the lamp driving circuit. Further, the inclusion of these additional components increases manufacturing costs.

The lamp voltage (or lamp current) may be sensed to detect a light dropout during a normal operation. If the lamp voltage exceeds a predetermined maximum voltage for the lamp to operate normally, the lamp is determined to have dropped out (e.g., light from the lamp is extinguished). The controller is then quickly switched from a (normal) operating mode to a starting (ignition) mode to re-ignite the lamp. The transition from the operation mode to the starting mode usually requires at least one low frequency cycle. Any time duration less than approximately one low frequency cycle could result in a false lamp dropout detection.

Figure 11:
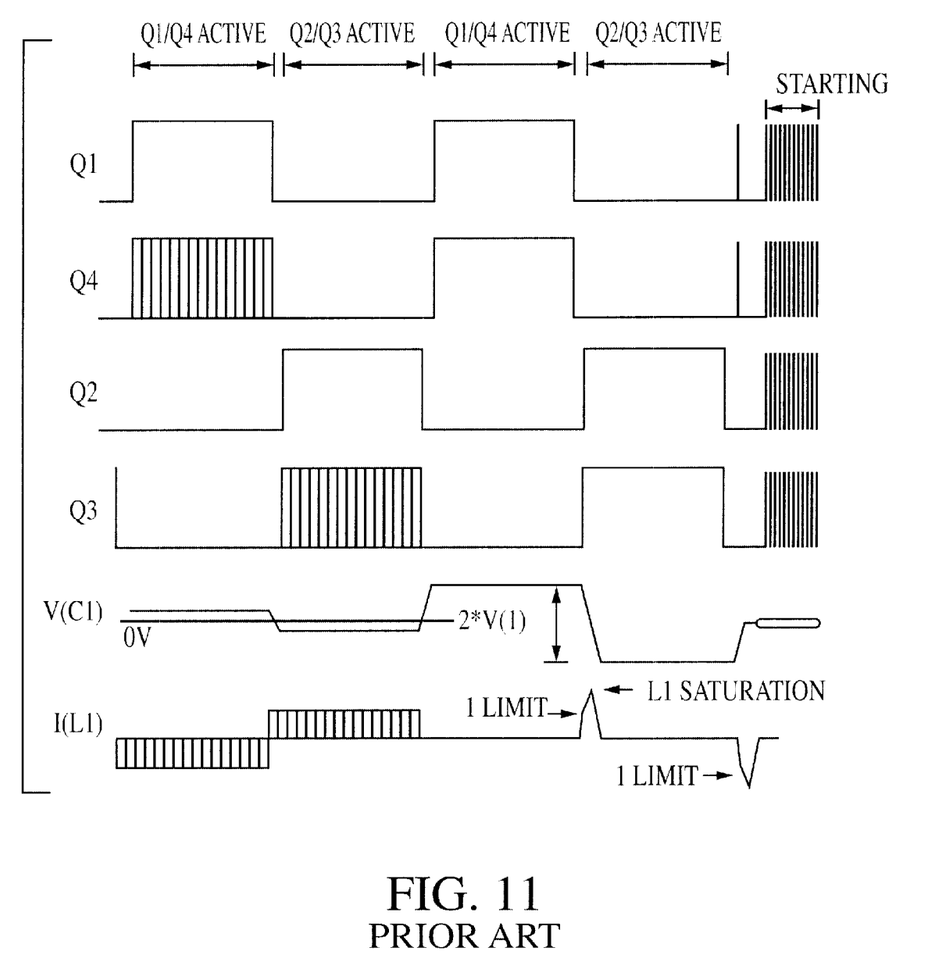
FIG. 11 illustrates a switch timing diagram for a prior art control circuit.

An analysis of the circuit operation will now be provided, with reference to FIGS. 8 and 11. Assume that the lamp is extinguished when the switch pair Q2 and Q3 is active after the duty cycle is determined. The lamp voltage stays the same for the switch pair Q2 and Q3 pair until the end of the half cycle. During the next half cycle, switching pair Q1 and Q4 become active. Since the lamp has dropped out (e.g., been extinguished) and there is no current flowing, switching pair Q1 and Q4 stays ON for the entire half cycle. As a result, the buck filter capacitor C1 is fully charged to become substantially equal to the bus voltage V(1).

At the completion of this half cycle, another half cycle starts, in which switching pair Q2 and Q3 is turned ON. The voltage across the buck inductor L1 is substantially equal to twice the bus voltage V1 because of the voltage on the buck filter capacitor C1. The current in the buck inductor L1 rises linearly in a very short period of time to a predetermined limit. As a result, switch Q3 turns OFF while switch Q2 remains ON. The current in the buck inductor L1 freewheels through an internal diode (not shown) of switch Q4, causing the entire buck filter voltage to be dropped across the buck inductor L1. The polarity of this voltage is the same as when switch Q3 is ON. Thus, the current in the buck inductor L1 continues to rise while the voltage on the buck filter capacitor C1 slowly drops (decreases). Eventually, the buck inductor L1 saturates, causing a large freewheeling current. It should be noted that switches Q1 through Q4 should be selected so as to be strong enough to handle the current without any characteristic degradation.

SUMMARY OF THE INVENTION

The present invention overcomes the drawbacks discussed above, in which the spike lamp current superimposed on the low frequency square wave lamp current is higher than an envelope of the low frequency square wave lamp current. The present invention reduces the high current stress that would otherwise be imposed on the semiconductor switches during the lamp current (or voltage) polarity transition, especially when the lamp has just been extinguished, and the insufficient electrode heating during starting after lamp breakdown by a high frequency current.

Accordingly, an object of the present invention is to provide a smooth low frequency square wave lamp current during a normal operation mode, even if a spike current is superimposed on the low frequency square wave lamp current. Any spike current superimposed on the low frequency square wave lamp current will be within an envelope of the low frequency square wave lamp current, so that the spike current does not change the characteristics of the low frequency square wave lamp current.

Another object of the present invention is to reduce current stresses imposed on semiconductor switches during a polarity transition (change) of the lamp voltage (or lamp current) after the lamp extinguishes. According to the instant invention, when the lamp extinguishes, part of the energy stored in the buck filter capacitor C1 is released to the DC bus line, reducing electrical stresses on the various electrical components.

Another object of the present invention is that, during a starting (ignition) mode after the lamp breaks down, an imbalanced high frequency current is supplied to the lamp. The net imbalance of the high frequency lamp current is a DC current that increases the RMS current of the lamp that helps the lamp pass a glow-to-arc transition.

According to an object of the present invention, an inverter circuit that drives a lamp includes a buck filter network; an ignition network including at least an ignition capacitive device; a plurality of switching devices; and a controller. The controller controls an ON time and an OFF time of each switching device, so as to effect a polarity transition of at least one of a lamp voltage and/or a lamp current. The controller also inserts a predetermined dead time delay before the polarity transition.

According to an advantage of the invention, the predetermined dead time delay may be variable, and, for example, may be varied in accordance with a generated load voltage.

According to another advantage of the invention, a lookup table is used to store data related to a length of time of the predetermined dead time delay. The predetermined dead time delay operates to minimize a lamp current spike during the polarity transition by ensuring that the spike superimposed on the lamp current is smaller than an envelope of a square wave low frequency lamp current.

According to another object of the present invention, an inverter circuit that drives a lamp is disclosed having an ignition network that includes at least an ignition capacitive device; a plurality of switch devices; and a controller that controls a duty cycle of each switch device of the plurality of switching devices. The duty cycle creates a polarity transition in one of a lamp voltage and a lamp current. A dead time delay of a predetermined time (which may be variable) is established before the polarity transition. It is noted that the plurality of switching devices may be a full bridge.

According to an advantage of the invention, the predetermined time is varied in accordance with a load voltage generated by the driving circuit. In this regard, it is noted that data related to the predetermined time may be stored in a lookup table.

According to an advantage of the present invention, the dead time delay operates to minimize a lamp current spike during the polarity transition by ensuring that the spike superimposed on the lamp current is smaller than an envelope of a square wave low frequency lamp current.

A still further object of the present invention pertains to an inverter circuit that drives a lamp that includes a buck filter network with a capacitance device, such as, for example, a capacitor; and at least one switch pair that has a predetermined duty cycle and which is turned ON and OFF for several high frequency cycles at a beginning of a low frequency half cycle.

According to an advantage of the invention, the switch pair is turned ON and OFF in accordance with a load voltage applied to the driving circuit. In particular, the predetermined duty cycle may be set in accordance with a sensed load voltage generated by the driving circuit. Further, the predetermined duty cycle may be varied in accordance with the sensed load voltage.

An advantage of the invention resides in that at least one switch pair is turned ON and OFF for several high frequency cycles at a beginning of a low frequency half cycle to discharge an energy stored in a buck filter energy storage device of the buck filter network. In particular, the energy stored in the buck filter energy storage device may be discharged to a DC voltage source, such that a voltage on the buck filter energy storage device is approximately equal to zero at a start of a half cycle.

Another object of the present invention pertains to a method for driving a lamp, comprising providing an ignition network to ignite a lamp; providing a buck filter network to continue driving the lamp after the lamp is ignited; and controlling a duty cycle of at least one switching pair to effect a polarity transition of at least one of a lamp voltage and a lamp current to insert a predetermined dead time delay before the polarity transition.

According to an advantage of the method, a duty cycle of at least one switching pair is controlled to insert a variable dead time delay. The dead time delay may be varied in accordance with a load voltage. Further, data related to the dead time delay may be stored in a lookup table. Controlling a duty cycle operates to minimize a lamp current spike during the polarity transition by ensuring that the spike superimposed on the lamp current is smaller than an envelope of a square wave low frequency lamp current.

A still further object of the invention pertains to a method for driving a lamp, comprising using an ignition network to ignite a lamp; using a buck filter network to drive the lamp after the lamp is ignited; and controlling at least one switch pair to have a predetermined duty cycle, wherein the at least one switch pair is turned ON and OFF for several high frequency cycles at a beginning of a low frequency half cycle.

The method of the present invention operates to control at least one switch pair to turn ON and OFF in accordance with a load voltage. The predetermined duty cycle may be set in accordance with a sensed load voltage. Accordingly, the predetermined duty cycle may be varied in accordance with the sensed load voltage.

According to an advantage of the present method, the at least one switch pair is turned ON and OFF for several high frequency cycles at a beginning of a low frequency half cycle to discharge an energy stored in a buck filter energy storage device of the buck filter network. Further, the energy stored in the buck filter energy storage device may be discharged to a DC voltage source, such that a voltage on the buck filter energy storage device is approximately equal to zero at a start of a half cycle.

BRIEF DESCRIPTION OF THE DRAWINGS

The foregoing and other objects, features, and advantages of the invention will be apparent from the following embodiment as illustrated in the accompanying drawings, in which reference characters refer to the same parts throughout the various views, and wherein.

DETAILED DESCRIPTION OF THE PREFERRED EMBODIMENTS

Figure 1:
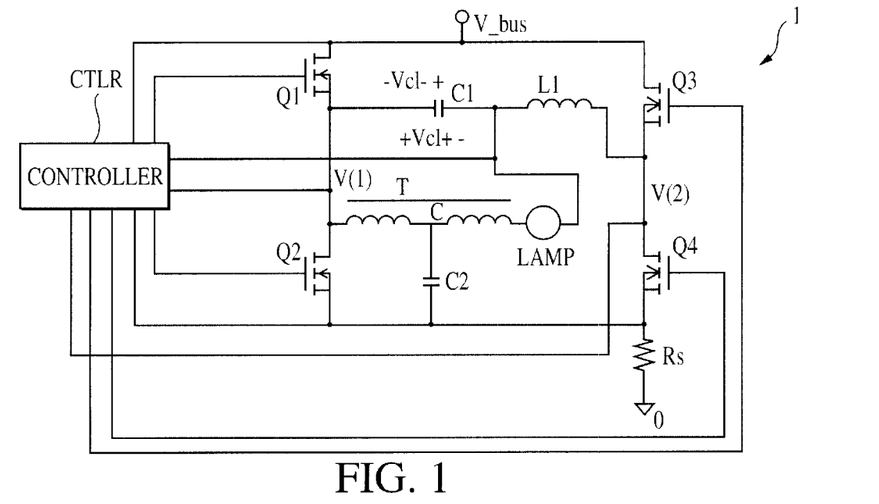
FIG. 1 illustrates a basic schematic diagram in accordance with the present invention.
Figure 12:
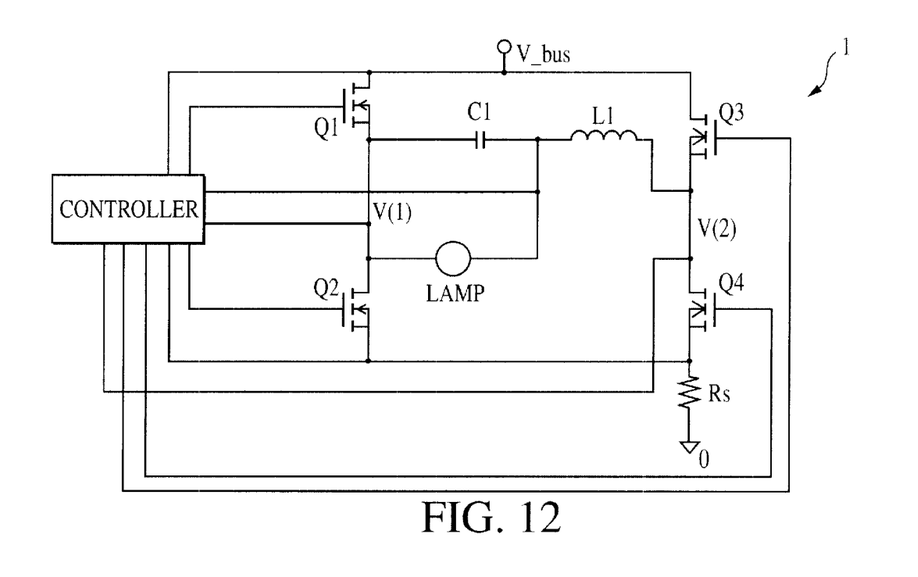
FIG. 12 illustrates a diagram of a high intensity discharge lamp driving and control circuit according to the present invention.

FIG. 1 illustrates a lamp driving circuit 1 in accordance with the present invention. FIG. 12 illustrates an alternative driving circuit in accordance with the present invention. As shown in FIG. 1, the lamp driving circuit 1 comprises an inductive device L1, a first energy storage device C1, a second energy storage device C2, an inductive element T, a sensing device Rs, a plurality of switching devices Q1 to Q4, a high intensity discharge (HID) device LAMP, and a controller CTLR.

In the disclosed embodiment, the inductive device L1 comprises, for example, a buck filter inductor; the first energy storage device C1 comprises, for example, a buck filter capacitor; the second energy storage device comprises, for example, an ignition capacitor; the sensing device Rs comprises, for example, a sensing resistor; and switching devices Q1 to Q4 comprise, for example, semiconductor switches, such as, metal oxide semiconductor field effect transistors (MOSFETs) having an internal diode connected between its drain and source terminals. However, it is understood that equivalent elements may be substituted for the disclosed elements, and that variations may be made without departing from the spirit and/or scope of the instant invention.

Buck filter inductor L1 and buck filter capacitor C1 form a chopper (buck) filter network, while inductive element T and ignition capacitor C2 form a high frequency inverting resonant network (also referred to as an ignition network).

During a starting (ignition) operation, the ignition network formed by the inductive element T and capacitor C2 is energized by a frequency and duty cycle varying source formed by the application of a voltage $V\_$ bus that is supplied to the controller CTLR and switched by switching devices Q1 and Q2. By controlling the ON and OFF duty time (cycle time) of switching devices Q1 and Q2, the frequency and/or the duty cycle in each frequency cycle is swept from a predetermined high frequency of, for example, approximately 200 kHz, to a predetermined low frequency of, for example, approximately 100 kHz. Thus, the resonant frequency of the ignition network is within the boundary from approximately 100 kHz to approximately 200 kHz.

Generally speaking, in order to generate an ignition voltage having a magnitude sufficient to cause a lamp breakdown requires that the operating frequency be swept either from the predetermined high frequency to the predetermined low frequency, or from the predetermined low frequency to the predetermined high frequency, toward a desired ignition voltage.

In the present invention, the duty cycle for switch Q1 is selected (designed) to be different from the duty cycle for switch Q2. This duty cycle difference creates a net DC component to drive the ignition network in addition to the AC component. Since a gain for a DC signal is zero to any resonant network, there is no effect on the ignition peak voltage, due to the imbalance of the duty cycle of the driving source. Thus, the effective DC voltage from the driving source is entirely dropped across capacitor C2. However, it is understood that the instant invention is equally applicable to the situation in which the duty cycle for switches Q1 and Q2 are substantially equal.

During the starting operation (e.g., igniting of the HID lamp), switches Q3 and Q4 are switched in-phase with switches Q2 and Q1, respectively. The chopper (buck) filter network is energized by the imbalanced driving source as is the ignition network. If switch pair Q1 and Q4 pair has a longer duty cycle than switch pair Q2 and Q3, a positive net DC voltage Vcl+ across buck filter capacitor C1 will have a positive potential (+) towards its left side (e.g., the side of capacitor C1 electrically connected to switch Q1) and a negative potential (−) toward its right side (e.g., the side of capacitor C1 electrically connected to inductor L1), as shown in FIG. 1.

On the other hand, if switch pair Q2 and Q3 has a longer duty cycle than switch pair Q1 and Q4, a negative net DC voltage Vcl− develops across buck filter capacitor C1 with a negative potential (−) towards its left side (e.g., the side of capacitor C1 electrically connected to switch Q1) and a positive potential (+) towards its right side (e.g., the side of capacitor C1 electrically connected to inductor L1), as shown in FIG. 1.

Referring to FIG. 1, when inductor L1 is selected to have a value of approximately 670 $\mu$H, and capacitor C1 is selected to have a value of approximately 0.22 $\mu$F, the buck resonant network exhibits a resonant frequency of approximately 13 kHz, which is much lower than the sweeping frequencies of approximately 100 kHz to approximately 200 kHz, as discussed above. Thus, there is little (if any) resonant voltage generated across inductor L1 or capacitor C1 before the lamp breaks down.

After the lamp breaks down during the starting operation, the lamp current flows through switch pair Q1 and Q4 during one half of a high frequency cycle and through switch pair Q2 and Q3 during another half of the high frequency cycle. The high frequency lamp current is small due to the fact that the inductor L1, the capacitor C1, the inductive element T, and the HID lamp LAMP form a low pass network having a corner frequency that is much lower than the above-noted sweeping frequencies. The high frequency lamp current is additionally small due to the fact that the duty cycle cannot be used to adjust it (e.g., the duty cycle is used to adjust the peak ignition voltage).

The value of the net DC current depends upon the difference in the current flow (controlled by switch pair Q1 and Q4 and switch pair Q2 and Q3) that flows through the inductor L1, the inductive element T, and the HID lamp LAMP, which is determined in accordance with the duty cycle of switch pair Q1 and Q4 and switch pair Q2 and Q3.

The magnitude of the net DC current of the lamp is a function of: (i) the difference in the duty cycle which generates the net DC voltage on buck filter capacitor C1; (ii) the lamp voltage after breakdown; and (iii) the parasitic resistance in series with the lamp.

Figure 2A:
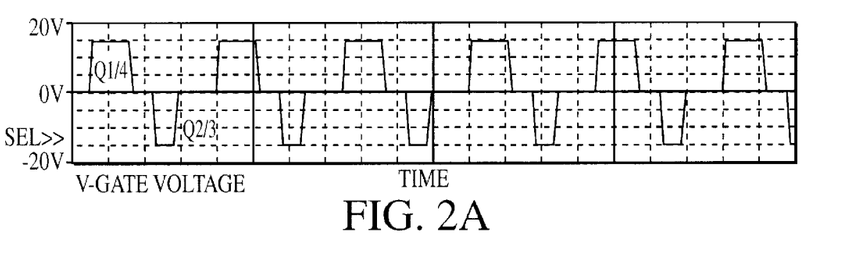
FIGS. 2A to 2C illustrate various waveforms of an imbalanced high frequency lamp current and a driving source during a starting (ignition) mode.
Figure 2B:
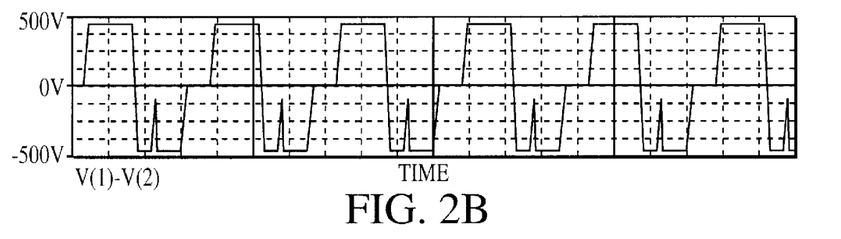
Figure 2C:
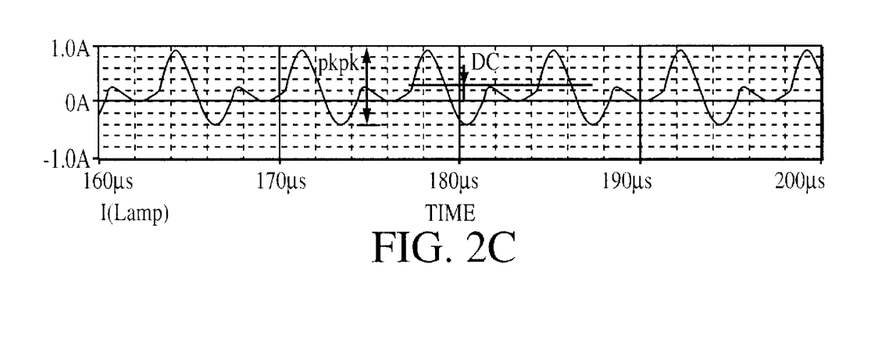

Simulated waveforms are shown in FIGS. 2A to 2C. FIG. 2A illustrates waveforms supplied to the gates of switch pair Q1 and Q4, and switch pair Q2 and Q3. FIG. 2B illustrate waveforms of driving source voltage between V(1) and V(2) for the output networks and the lamp. FIG. 2C illustrates a current flow in the HID lamp, in which switch pair Q1 and Q4 is turned ON for approximately 2 $\mu$S, while switch pair Q2 and Q3 is turned ON for approximately 1 $\mu$S. This results in a net imbalance of approximately 1 $\mu$S over a period of 7 $\mu$S. As shown in FIG. 2C, the net average current is positive. From the viewpoint of starting (igniting) the HID lamp, a reasonable amount of current (either a high frequency current or a low frequency current) is needed to flow through the lamp after it breaks down. It is noted that with a same peak-to-peak current, the RMS value is higher with a DC bias than without the DC bias. It is further noted that the reasonable amount of RMS current helps the lamp electrode warm up and aids in a glow-to-arc transition.

After the lamp is ignited (started), the controller CTLR of the lamp drive circuit (electronic ballast) 1 switches to a normal operation mode, in which switches Q1 and Q2 are operated at a selected low frequency of, for example, approximately 170 Hz, and switches Q3 and Q4 are operated at a selected high frequency of, for example, approximately 50 kHz. It is noted that voltage V(1) at the junction of switches Q1 and Q2 is HIGH when switch Q1 is ON, and is LOW when switch Q2 is ON. Further, during a HIGH voltage to LOW voltage transition (or a LOW voltage to HIGH voltage transition), which occurs at the polarity transition of the lamp voltage (or lamp current), a charge (or discharge) current flows through the ignition capacitor C2.

Figure 3:
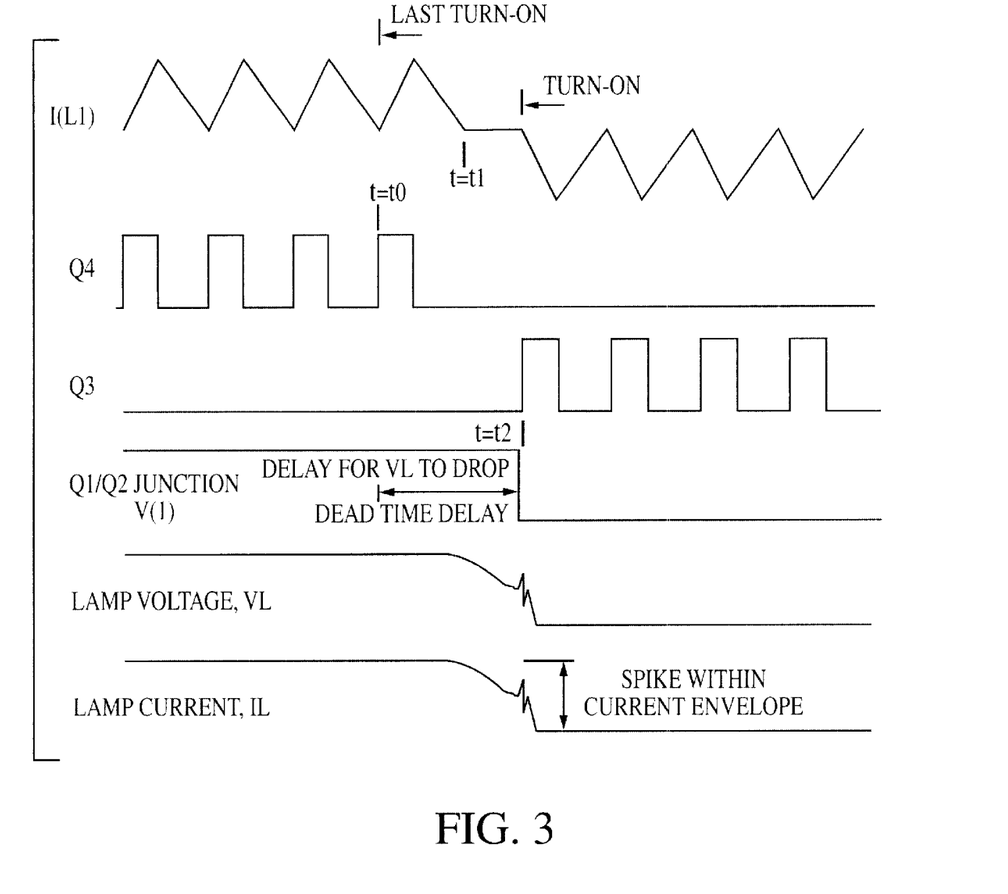
FIG. 3 illustrates a superimposed current spike that is hidden within an envelope of a square wave current associated with the present invention.

A detailed explanation will now be provided with reference to FIGS. 1 and 3. During a normal operation, the resonant frequency of the chopper network formed by capacitor C1 and inductor L1 is lower than the operating high frequency of approximately 50 kHz. The resonant frequency of the inverter (ignition) network, formed by ignition capacitor C2 and inductive element T, is higher than the high frequency of approximately 50 kHz in the normal operation. The voltage across the buck filter capacitor C1 may be considered to be constant during one high frequency cycle. The voltage across the inductive element T may be considered to be substantially equal to zero during one high frequency cycle. Lamp voltage VL may be considered to be substantially equal to the voltage across the buck filter capacitor C1. A voltage at point C (e.g., the point where one lead of the ignition capacitor C2 is connected to the inductive element T in FIG. 1) is substantially equal to V(1).

At time t equals 0, switch pair Q1 and Q4 are ON and switch pair Q2 and Q3 are OFF. A chopper current I(L1), or a sensing resistor voltage V(Rs), ramps up and reaches a predetermined peak level. At this point, switch Q4 turns OFF while switch Q1 remains ON. A free-wheeling current starts to flow through the buck filter inductor L1, the buck filter capacitor C1, the HID lamp LAMP, and the internal diode of switches Q1 and Q3 (not shown), until time t becomes equal to t1. At time t equals t1, switch Q1 remains ON, but the free-wheeling current becomes substantially equal to zero. V(1) is HIGH until time t equals t2.

At time t equals t2, switch Q1 turns OFF, switch pair Q2 and Q3 goes active, and a new half cycle is initiated. From time t1 to time t2, the lamp current decays toward zero. At time t2, V(1) switches from HIGH to LOW. A capacitive current flows through the HID lamp and the ignition capacitor C2. This capacitive current is superimposed on the lamp current near its zero crossing point. The peak of the spike is less than the envelope of the square wave lamp current, and does not adversely affect the operation of the HID lamp.

Figure 4:
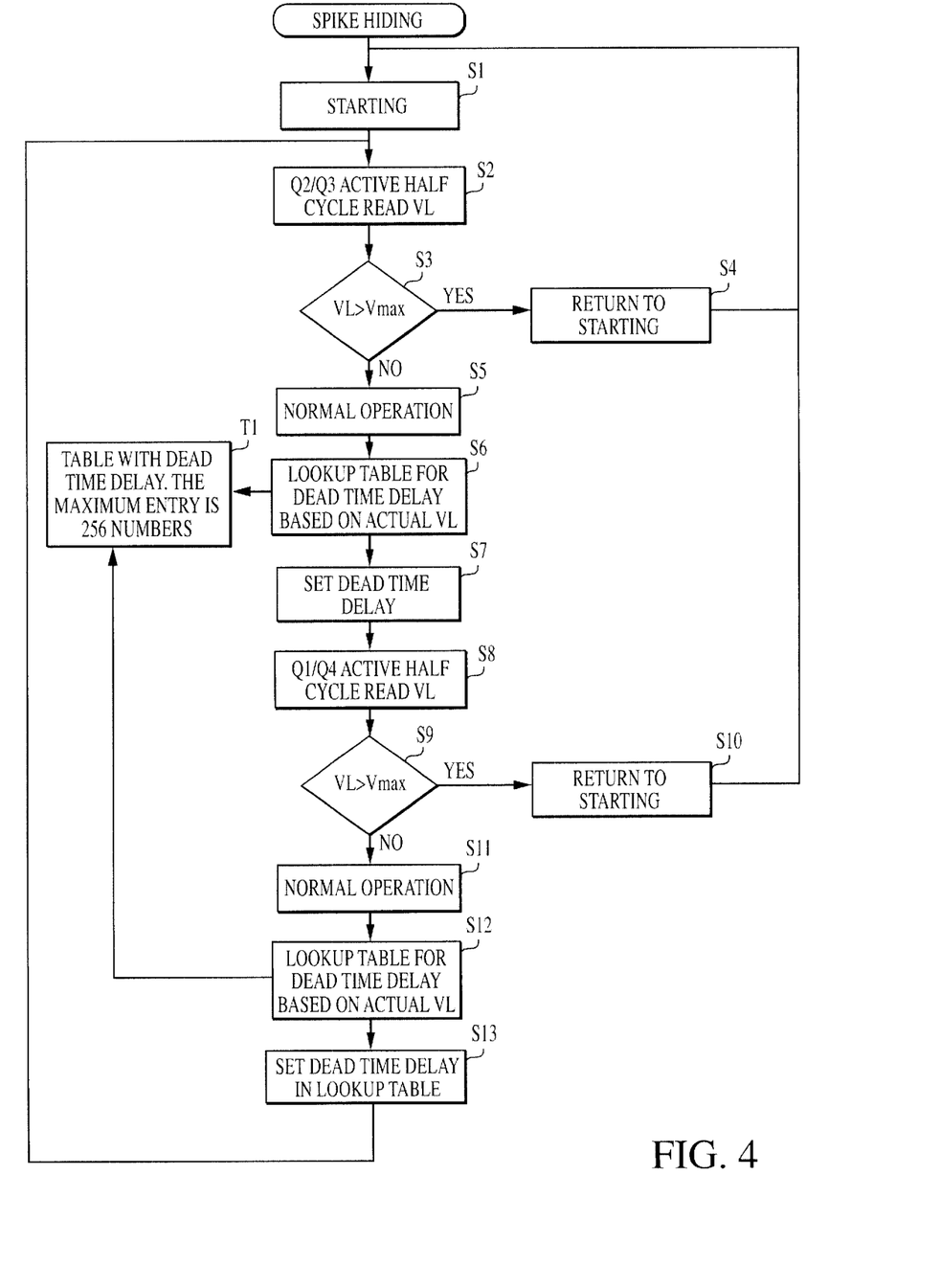
FIG. 4 illustrates a flow chart for a 'spike hiding' scheme implemented by the present invention.

An example of a procedure for performing the above-discussed spike hiding algorithm is shown in FIG. 4. In the disclosed example, power is applied to the ballast and control enters a starting mode (step S1). A normal operation starts (step S2) from a first half cycle of the low frequency operation, in which switch pair Q2 and Q3 is the active half cycle. The load (lamp) voltage VL is read in step S2 and compared (step S3) with a maximum load voltage Vmax. If the lamp voltage VL is greater than the maximum load voltage Vmax, the lamp is extinguished (or, alternatively, there is no load), in which event, processing returns (step S4) to step S1.

On the other hand, if the load (lamp) voltage VL is less than the maximum load voltage Vmax, the load is determined to be normal (step S5). After the first half cycle ends, a look-up table T1 is examined to determine a dead time delay related to the actual load voltage (step S6). It is noted that the higher the actual load (lamp) voltage, the larger the load impedance (e.g., resistance of the lamp). Further, the larger the load impedance, the longer it takes to discharge the buck filter capacitor C1 to substantially zero volts. Thus, as the load impedance increases, a longer dead time delay is required before the switch pair Q1 and Q4 is turned ON.

After the dead time is determined, set from the look-up table T1, and elapsed (step S7), switch pair Q1 and Q4 is made active, and the load (lamp) voltage VL is re-read (step S8). The procedure from is point (steps S10 to S13) is the same as above with respect to the active half cycle of switch pair Q2 and Q3, except that a new delay value from the lookup table T1 may be used.

Figure 13:
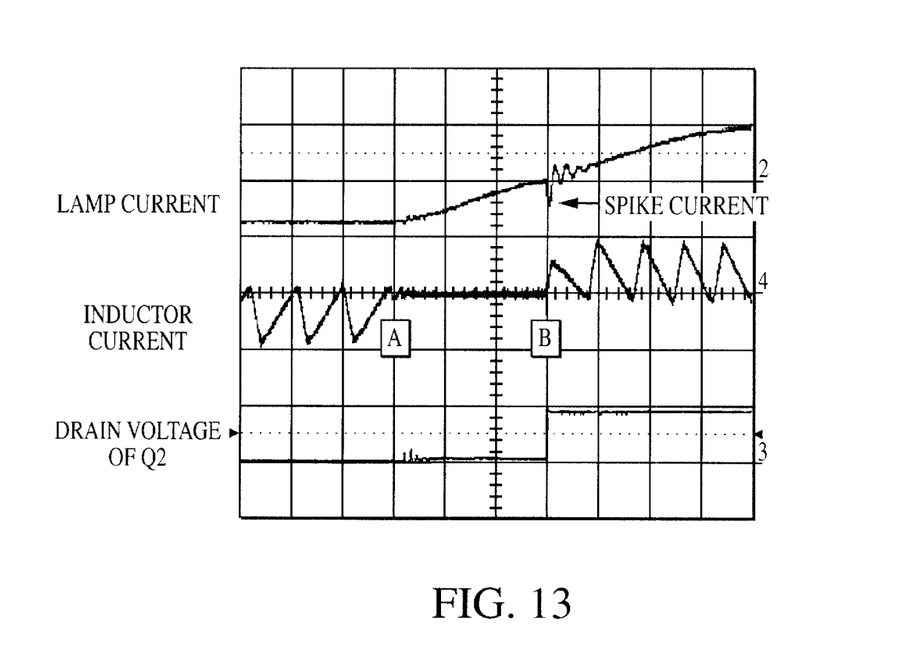
FIG. 13 illustrates waveforms produced by a 70 Watt high intensity discharge lamp driven by the circuit of the present invention, in which a spike current occurs at a zero crossing due to a dead time delay.

FIG. 13 shows the actual dead time delay for a 70 watt HID lamp at a lamp voltage VL equal to approximately 90 volts. The time from point A to point B in FIG. 13 represents a dead time delay of approximately 60 microseconds. With this dead time delay, a spike current is superimposed on the lamp current proximate the zero crossing point. As shown in FIG. 13, the peak value of the spike current is less than a square waveform envelope of the lamp current.

During a normal operation mode after the lamp is started (ignited), the lamp may extinguish (e.g., go out) at any time due to various reasons, such as, but not limited to, for example, the age of the HID lamp LAMP and/or a broken electrical connection.

Figure 5A:
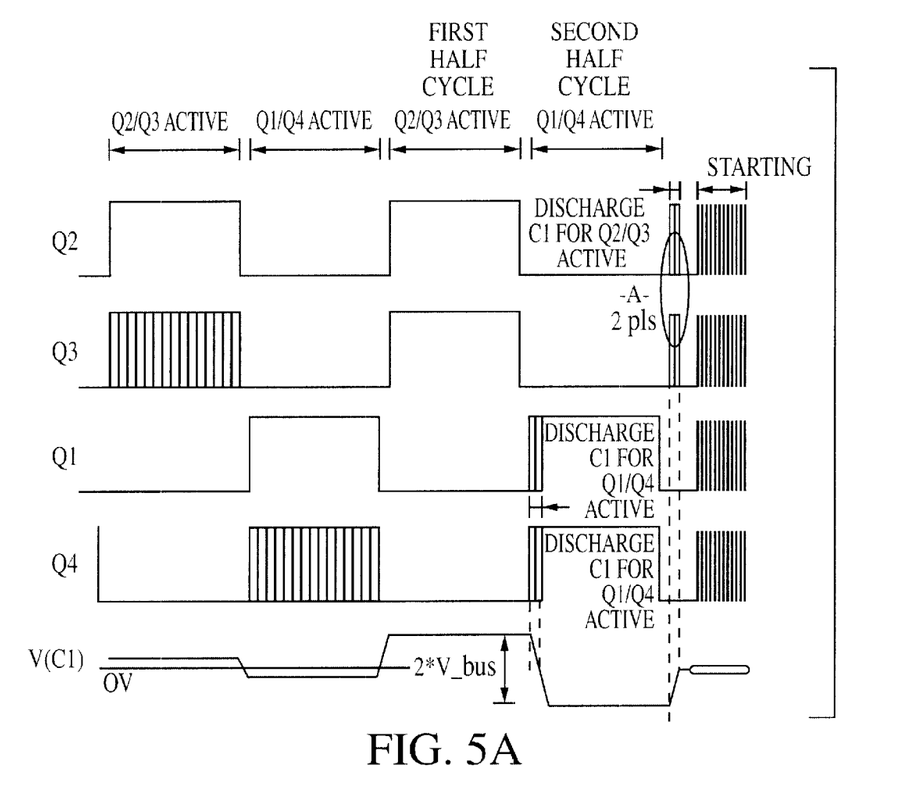
FIGS. 5A and 5B show switch timing diagrams for discharging energy stored in a buck capacitor during a phase transition after a lamp is extinguished during a normal operation mode.
Figure 5B:
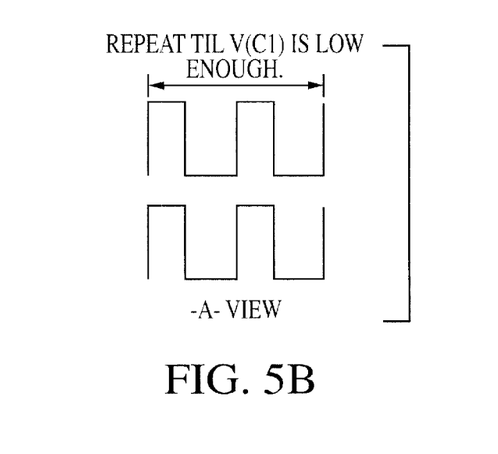

FIGS. 5A and 5B illustrate detailed waveforms of the electronic ballast during the normal mode of operation. FIG. 12 illustrates an alternative of the schematic diagram of FIG. 1 of the present invention, in which the high frequency inverting resonant network is not necessary.

When the electronic ballast (lamp drive circuit) 1 senses no current in switch pair Q2 and Q3, the active half cycle of the switch pair Q2 and Q3 remains ON, while switch pair Q1 and Q4 remains OFF for one half of a low frequency cycle. The buck filter capacitor C1 is fully charged with the high potential (e.g., +) of the net DC voltage Vcl being on the side that connects to the buck inductor L1, and its low potential (e.g., −) being on the side that connects to the junction of switch devices Q1 and Q2. At the end of the first half cycle, switch pair Q2 and Q3 turns OFF. After the elapse of the appropriate dead time in which all switches are OFF, switches Q1 and Q4 turn ON. At this point, there is no discharge path for the energy stored in the buck filter capacitor C1 during the first half cycle and during the dead time. Thus, the buck filter capacitor C1 is fully charged at the beginning of the second half cycle (with its voltage being substantially equal to the bus voltage).

Switch pair Q1 and Q4 turns ON for a brief period of time (e.g., a time period equal to, but not limited to, for example, a couple of micro-seconds). When this occurs, the voltage in the buck filter capacitor C1 is slightly reduced, and the current in the buck filter inductor L1 is established to, for example, a couple of amps. Then, switch pair Q1 and Q4 turns OFF. However, the current in the buck filter inductor L1 remains. The rate of charge follows the equation:

$$\Delta I/\Delta t = (V\_bus - V(C1))/L1,$$

where:

$\Delta I/\Delta t$ equals the rate of charge over time;

$V\_bus$ equals the bus line voltage;

$V(C1)$ equals the voltage stored in buck filter capacitor C1; and

L1 equals the value (in micro-henries) of the buck filter inductor.

The current flows through the internal diode of switching device Q2 (not shown), the internal diode of switching device Q3 (not shown), the buck filter capacitor C1, the buck filter inductor L1, and voltage V_bus.

A portion of the energy stored in the buck filter capacitor C1 is fed back into the bus line. The switch pair Q1 and Q4 turns OFF for a few micro-seconds when the buck filter inductor L1 current approaches zero, after which switch pair Q1 and Q4 turns ON again for another predetermined period of time, such as, but not limited to, for example, a couple of micro-seconds, so as to further discharge a voltage V(C1) stored in the buck filter capacitor C1. After the elapse of the another predetermined period of time, switch pair Q1 and Q4 turns OFF, and the energy stored in capacitor C1 is released to the bus line, so that the voltage V(C1) is decreased. During the next active half cycle, switch pair Q2 and Q3 is active. The operation of switch pair Q2 and Q3 is the same as with respect to switch pair Q1 and Q4 discussed above, except that switch pair Q2 and Q3 are turned ON and OFF for several cycles. It is also noted that the control can be applied to not only a full bridge circuit, but also to a half-bridge circuit, where switches Q1 and Q2 can be replaced by two capacitive elements.

It is noted that the gradual discharging of the buck filter capacitor C1 at the beginning of a half cycle significantly reduces current stresses on the semiconductor switches Q1 to Q4, especially when the lamp is OFF and the voltage of the buck filter capacitor C1 is large. It is also noted that the control can be applied not only to full bridge but also to half bridge where Q1 and Q2 can be replaced by two capable elements.

Figure 6:
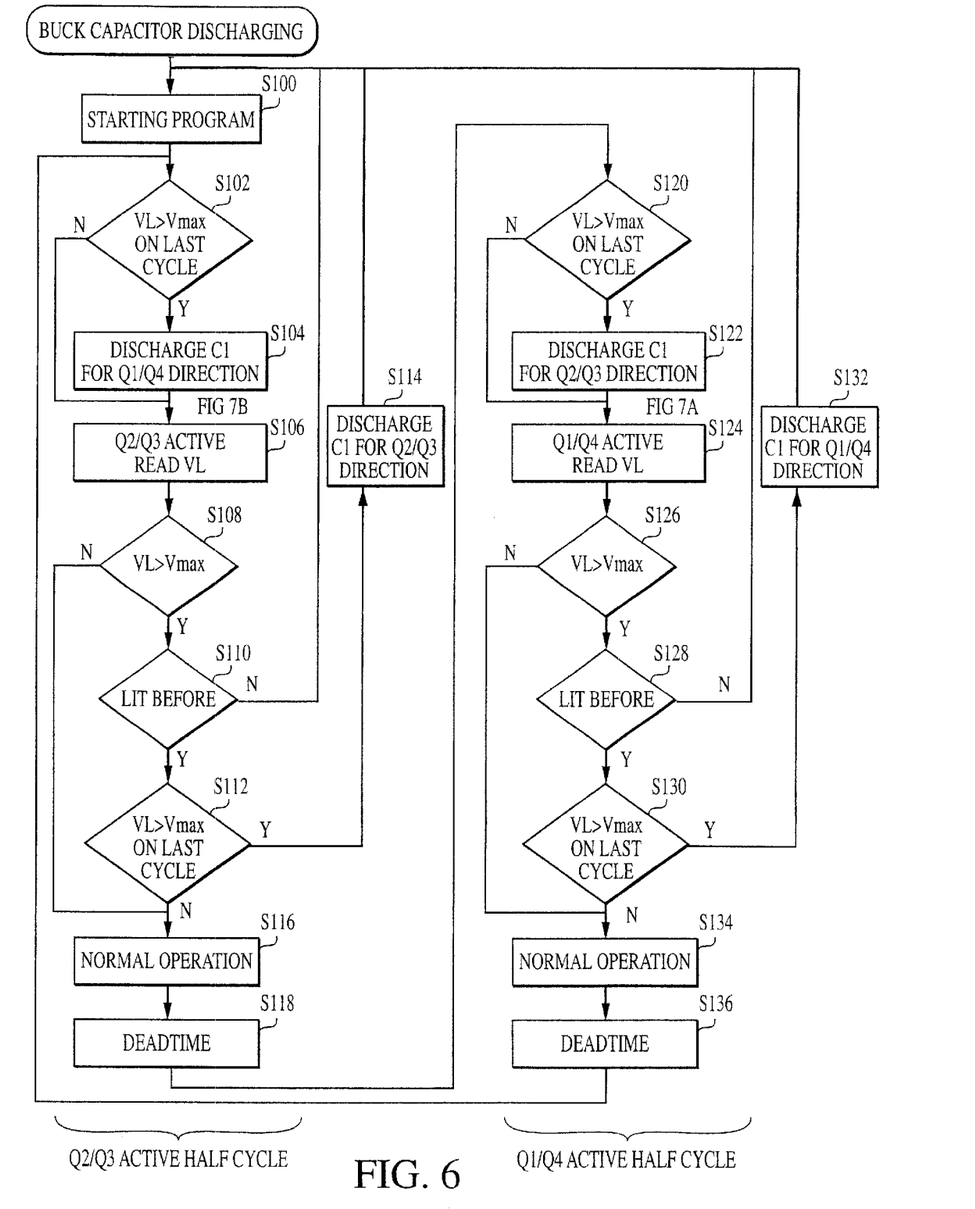
FIG. 6 and FIGS. 7A and 7B illustrate flow charts for discharging energy stored in the buck capacitor of the present invention when the lamp is extinguished.
Figure 7A:
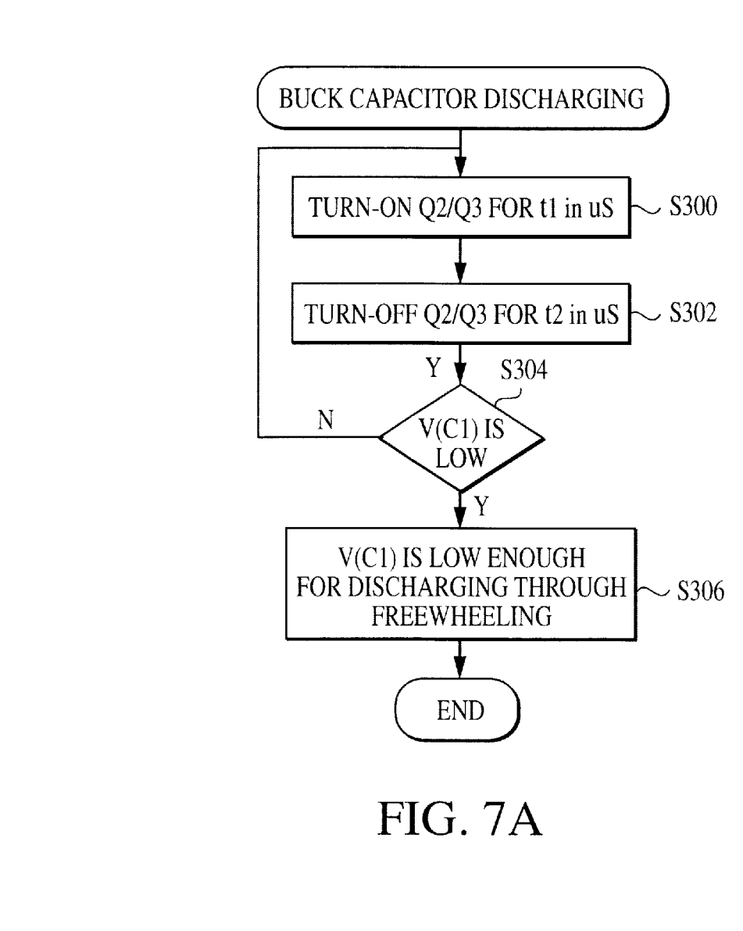
Figure 7B:
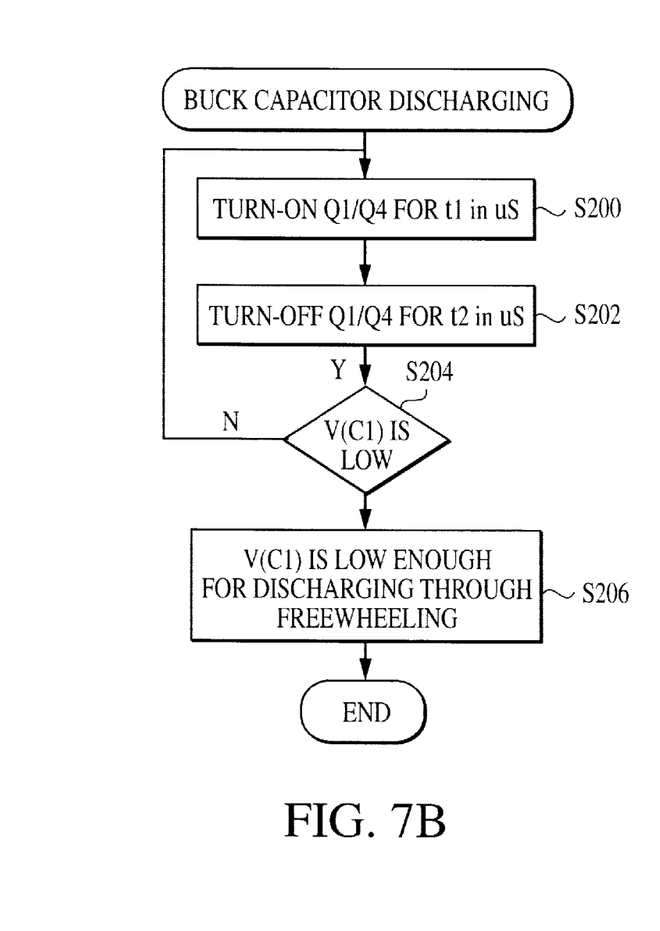

An example of the above-discussed algorithm is illustrated in FIGS. 6, 7A and 7B, to be described below.

Power is applied to the control circuit, and control enters a starting mode (step S100). A normal operation starts with a determination of whether the load (lamp) voltage VL is greater than a maximum load voltage Vmax on a last cycle (step S102). If the lamp voltage VL is greater than the maximum load voltage Vmax, a subroutine (step S104; to be described below with respect to FIG. 7B) is performed to discharge the buck filter capacitor C1.

Thereafter, the switch pair Q2 and Q3 is made active, and the lamp voltage VL is re-read (step S106). The re-read voltage is compared to the maximum load (lamp) voltage Vmax (step S108). If the lamp voltage VL exceeds the maximum load voltage Vmax, processing proceeds to step S110, where it is determined whether the HID lamp was lit. Alternatively, if it is determined at step S108 that the load voltage VL is less than or equal to the maximum load voltage Vmax, processing skips steps S110 and S112, and proceeds to step S116.

If it is determined at step S110 that the HID lamp was lit, processing proceeds to step S112 to determine whether the re-read voltage exceeds the maximum load (lamp) voltage Vmax during the last cycle (step S112). If the determination is affirmative, processing proceeds to step S114 to perform a routine (to be described in detail with respect to FIG. 7A) to discharge capacitor C1 while switch pair Q2 and Q3 is active, after which, processing returns to step S110. Alternatively, if the determination at step S112 is negative, the load is determined to be normal, and the dead time delay related to the actual load voltage (step S118) is obtained. At this point, the active half cycle for the switch pair Q2 and Q3 is completed.

Thereafter, the active half cycle for switch pair Q1 and Q4 begins, with the execution of step S120. Steps S120 to S136 correspond to steps S102 to S118, and hence, a detailed description thereof is omitted. However, it is noted that the processes performed at steps S122 and S132 are reversed from the processes described at steps S104 and S114. Specifically, the process performed at step S122 corresponds to the process described at step S114, while the process performed at step S132 corresponds to the process described at step S104.

The subroutine for discharging capacitor C1 during the active half cycle of switch pair Q1 and Q4 (steps S104 and S132) is illustrated in FIG. 7B. At step S200, the switch pair Q1 and Q4 is turned ON for a predetermined period of time, such as, for example, a few micro-seconds. At time t2, the switch pair is turned OFF (step S202) for a certain period of time, such as, for example, a couple of micro-seconds, and the voltage of the buck filter capacitor C1 is examined (step S204). If it is determined that the voltage of capacitor C1 is LOW, enough energy in the buck filter capacitor C1 has been dumped through free-wheeling (step S206), completing the subroutine. However, if the voltage on capacitor C1 is not LOW, processing returns to step S200 to repeat the subroutine, dumping energy in the buck filter capacitor C1 to the bus through free-wheeling.

The subroutine for discharging capacitor C1 during an active half cycle of switch pair Q2 and Q3 (steps S114 and S122) is illustrated in FIG. 7A. Steps S300 to S306 of this subroutine are essentially the same as described above with respect to steps S200 to S206. Thus, a detailed explanation of this subroutine is omitted herein.

By the above process, the semiconductor switches are subjected to reduced electrical stresses, thus prolonging the life of the electrical components.

The foregoing discussion has been provided merely for the purpose of explanation and is in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims. The methods described herein may comprise dedicated hardware or software implementations. Further, it is understood that the invention may be implemented in software using techniques (programming) other than described herein.

I claim:

1. An inverter circuit that drives a lamp, comprising:
   a buck filter network;
   an ignition network including at least an ignition capacitive device;
   a plurality of switching devices; and
   a controller that controls an ON time and an OFF time of each of said plurality of switching devices to effect a polarity transition of at least one of a lamp voltage and a lamp current, said controller inserting a predetermined dead time delay before said polarity transition.

2. The inverter circuit of claim 1, wherein said predetermined dead time delay is variable.

3. The inverter circuit of claim 2, wherein said predetermined dead time delay varies in accordance with a load voltage generated by said inverter circuit.

4. The inverter circuit of claim 1, wherein a length of time of said predetermined dead time delay is stored in a lookup table.

5. The inverter circuit of claim 1, wherein said predetermined dead time delay operates to minimize a lamp current spike during said polarity transition by ensuring that said at least one of said lamp voltage and said lamp current spike is smaller than an envelope of a square wave low frequency lamp current.

6. The inverter circuit of claim 1, wherein said plurality of switching devices comprises a full bridge circuit.

7. An inverter circuit that drives a lamp, comprising:
   a buck filter network;
   an ignition network including at least an ignition capacitive device;
   a plurality of switching devices; and
   a controller that controls a duty cycle of each switch device of said plurality of switching devices, said duty cycle creating a polarity transition in one of a lamp voltage and a lamp current, a dead time delay of a predetermined time being established before said polarity transition.

8. The inverter circuit of claim 7, wherein said predetermined time is variable.

9. The inverter circuit of claim 8, wherein said predetermined time is varied in accordance with a load voltage generated by said inverter circuit.

10. The inverter circuit of claim 7, wherein data related to said predetermined time is stored in a lookup table.

11. The inverter circuit of claim 7, wherein said dead time delay operates to minimize a lamp current spike during said polarity transition by ensuring that said one of said lamp voltage and said lamp current spike is smaller than an envelope of a square wave low frequency lamp current.

12. The inverter circuit of claim 7, wherein said plurality of switching devices comprises a full bridge circuit.

13. An inverter circuit that drives a lamp, comprising:
   a buck filter network; and
   at least one switch pair having a predetermined duty cycle, wherein said at least one switch pair is turned ON and OFF for several high frequency cycles at a beginning of a low frequency half cycle.

14. The inverter circuit of claim 13, wherein said at least one switch pair is turned ON and OFF in accordance with a load voltage generated by said inverter circuit.

15. The inverter circuit of claim 13, wherein said predetermined duty cycle of said at least one switch pair is set in accordance with a sensed load voltage generated by said driving circuit.

16. The inverter circuit of claim 13, wherein said predetermined duty cycle of said at least one switch pair is varied in accordance with a sensed load voltage generated by said inverter circuit.

17. The inverter circuit of claim 13, wherein said at least one switch pair is turned ON and OFF for several high frequency cycles at a beginning of a low frequency half cycle to discharge an energy stored in a buck filter energy storage device of said buck filter network.

18. The inverter circuit of claim 17, wherein said energy stored in said buck filter energy storage device is discharged to a DC voltage source, such that a voltage on said buck filter energy storage device is approximately equal to zero at a start of a half cycle.

19. The inverter circuit of claim 17, wherein said buck filter energy storage device comprises a capacitance device.

20. The inverter circuit of claim 19, wherein said capacitance device comprises a capacitor.

21. The inverter circuit of claim 13, wherein said at least one switch pair comprises a full bridge circuit.

22. A method for driving a lamp, comprising:

providing an ignition network to ignite a lamp;

providing a buck filter network to continue driving the lamp after the lamp is ignited; and controlling a duty cycle of at least one switching pair to effect a polarity transition of at least one of a lamp voltage and a lamp current to insert a predetermined dead time delay before the polarity transition.

23. The method of claim 22, wherein controlling a duty cycle of at least one switching pair comprises inserting a variable dead time delay.

24. The method of claim 22, further comprising varying the predetermined dead time delay in accordance with a load voltage.

25. The method of claim 22, further comprising storing data related to the predetermined dead time delay in a lookup table.

26. The method of claim 22, wherein controlling a duty cycle operates to minimize a lamp current spike during the polarity transition by ensuring that the at least one of the lamp voltage and the lamp current spike is smaller than an envelope of a square wave low frequency lamp current.

27. A method for driving a lamp, comprising:

using an ignition network to ignite a lamp;

using a buck filter network to drive the lamp after the lamp is ignited; and controlling at least one switch pair to have a predetermined duty cycle, wherein the at least one switch pair is turned ON and OFF for several high frequency cycles at a beginning of a low frequency half cycle.

28. The method of claim 27, wherein controlling at least one switch pair comprises turning ON and OFF the at least one switch pair in accordance with a load voltage.

29. The method of claim 27, further comprising setting the predetermined duty cycle in accordance with a sensed load voltage.

30. The method of claim 27, further comprising varying the predetermined duty cycle of the at least one switch pair in accordance with a sensed load voltage.

31. The method of claim 27, further comprising turning ON and turning OFF at least one switch pair for several high frequency cycles at a beginning of a low frequency half cycle to discharge an energy stored in a buck filter energy storage device of the buck filter network.

32. The method of claim 31, further comprising discharging the energy stored in the buck filter energy storage device to a DC voltage source, such that a voltage on the buck filter energy storage device is approximately equal to zero at a start of a half cycle.

* * * * *